(12) United States Patent
Mukerjee et al.

(10) Patent No.: US 6,692,859 B2
(45) Date of Patent: Feb. 17, 2004

(54) FUEL AND AIR SUPPLY BASE MANIFOLD FOR MODULAR SOLID OXIDE FUEL CELLS

(75) Inventors: Subhasish Mukerjee, Rochester, NY (US); Karl Jacob Haltiner, Jr., Fairport, NY (US); Haskell Simpkins, Grand Blanc, MI (US)

(73) Assignee: Delphi Technologies, Inc., Troy, MI (US)

( * ) Notice: Subject to any disclaimer, the term of this patent is extended or adjusted under 35 U.S.C. 154(b) by 168 days.

(21) Appl. No.: 09/852,246

(22) Filed: May 9, 2001

(65) Prior Publication Data

US 2002/0168560 A1 Nov. 14, 2002

(51) Int. Cl.$^7$ ................................................ H01M 8/02
(52) U.S. Cl. .......................................... 429/34; 429/39
(58) Field of Search .............................. 429/13, 32, 34, 429/38, 39

(56) References Cited

U.S. PATENT DOCUMENTS

| | | | | |
|---|---|---|---|---|
| 5,192,627 A | * | 3/1993 | Perry et al. ................ | 429/34 X |
| 5,298,341 A | * | 3/1994 | Khandkar et al. ............ | 429/32 |
| 5,480,738 A | * | 1/1996 | Elangovan et al. ........... | 429/32 |
| 6,110,612 A | * | 8/2000 | Walsh ....................... | 429/34 X |

* cited by examiner

Primary Examiner—Stephen Kalafut
(74) Attorney, Agent, or Firm—Jimmy L. Funke

(57) ABSTRACT

A base manifold for a modular solid oxide fuel cell assembly comprises a plurality of receiving areas for receiving a plurality of solid oxide fuel cell stacks; a fuel inlet passageway disposed between a manifold fuel inlet port and a plurality of stack fuel inlet ports; an oxidant inlet passageway disposed between a manifold oxidant inlet port and a plurality of stack oxidant inlet ports; a fuel outlet passageway disposed between a plurality of stack fuel outlet ports and a manifold fuel outlet port; and an oxidant outlet passageway disposed between a plurality of stack oxidant outlet ports and a manifold oxidant outlet port.

23 Claims, 4 Drawing Sheets

FUEL AND AIR SUPPLY BASE MANIFOLD FOR MODULAR SOLID OXIDE FUEL CELLS

BACKGROUND

Alternative transportation fuels have been represented as enablers to reduce toxic emissions in comparison to those generated by fossil and other conventional fuels used in reciprocating combustion-type engines. At the same time, tighter emission standards and significant innovation in catalyst formulations and engine controls has led to dramatic improvements in the low emission performance and robustness of conventionally fueled engine systems. Although these improvements have reduced the environmental differential between optimized conventional and alternative fuel vehicle systems, many technical challenges remain in order to make the conventionally-fueled internal combustion engine a nearly zero emission system having the efficiency necessary to make a host vehicle commercially viable.

Alternative fuels cover a wide spectrum of potential environmental benefits, ranging from incremental toxic and carbon dioxide ($CO_2$) emission improvements such as those facilitated by reformulated gasoline, alcohols, liquid petroleum gas ("LPG"), and the like; to significant toxic and $CO_2$ emission improvements such as those facilitated by natural gas, dimethyl ether ("DME"), and the like. Hydrogen is clearly the ultimate environmental fuel, with potential as a nearly emission-free engine fuel. Unfortunately, the market-based economics of alternative fuels and new power train systems are uncertain in the short to mid-term.

The automotive industry has made significant progress in reducing automotive emissions in both the mandated test procedures and in actual use. This has resulted in added cost and complexity of engine management systems. However, some of those costs are offset by other advantages of computer controls such as increased power density, fuel efficiency, drivability, reliability, and real-time diagnostics.

Future initiatives to require zero emission vehicles appear to be taking us into a new regulatory paradigm where asymptotically smaller environmental benefits come at a very large incremental cost. Yet, even an "ultra low emission" certified vehicle can emit high emissions in limited extreme ambient and operating conditions or with failed or degraded components.

One approach to addressing the issue of emissions is the employment of fuel cells, such as solid oxide fuel cells ("SOFCs"), in an automobile. A fuel cell is an energy conversion device that generates electricity and heat by electrochemically combining a gaseous fuel, such as hydrogen, carbon monoxide, or a hydrocarbon, and an oxidant, such as air or oxygen, across an ion-conducting electrolyte. The fuel cell converts chemical energy into electrical energy, which may then be used by a high-efficiency electric motor, or stored. SOFCs are currently constructed of solid-state materials, typically utilizing an ion conductive oxide ceramic as the electrolyte. A conventional electrochemical cell in a SOFC is comprised of an anode and a cathode with an electrolyte disposed therebetween. The oxidant passes over the oxygen electrode or cathode while the fuel passes over the fuel electrode or anode, generating electricity, water, and heat.

In a typical SOFC, a fuel flows to the anode where it is oxidized by oxygen ions from the electrolyte, producing electrons that are released to the external circuit, and mostly water and carbon dioxide are removed in the fuel flow stream. At the cathode, the oxidant accepts electrons from the external circuit to form oxygen ions. The oxygen ions migrate across the electrolyte to the anode. The flow of electrons through the external circuit provides for consumable or storable electricity. However, each individual electrochemical cell generates a relatively small voltage. Higher voltages may be attained by electrically connecting a plurality of electrochemical cells in series to form a stack.

Although any number of cells may be combined to form a stack having a desired output voltage, very tall stacks may incur several undesirable characteristics such as difficult maintenance and repair, awkward packaging, unequal and inefficient operating temperatures between center cells and end cells, unequal fuel distribution under varying fuel flow rates, high internal impedance, and inefficiency under rapidly varying output loads.

A SOFC cell stack also includes conduits to allow passage of the fuel and oxidant into, and byproducts as well as excess fuel and oxidant out of the stack. Generally, oxidant is fed to the structure from a manifold located on one side of the stack, while fuel is provided from a manifold located on an adjacent side of the stack. The fuel and oxidant are generally pumped through the manifolds and introduced to a flow field disposed adjacent to the appropriate electrode. The flow fields that direct the fuel and oxidant to the respective electrodes typically create oxidant and fuel flows that are perpendicular to one another across the electrodes.

Seals are provided around the edges of the various cell stack components to inhibit crossover of fuel and/or oxidant. For example, seals are disposed between the electrodes and adjacent flow fields, around manifolds, between flow fields and cell separators, and elsewhere.

SUMMARY

Advantages are achieved and drawbacks and disadvantages of the prior art are overcome or alleviated by providing a fuel and air supply base manifold for a modular solid oxide fuel cell assembly having a plurality of receiving areas for receiving a plurality of solid oxide fuel cell stacks; a fuel inlet passageway disposed between a manifold fuel inlet port and a plurality of stack fuel inlet ports; an oxidant inlet passageway disposed between a manifold oxidant inlet port and a plurality of stack oxidant inlet ports; a fuel outlet passageway disposed between a plurality of stack fuel outlet ports and a manifold fuel outlet port; and an oxidant outlet passageway disposed between a plurality of stack oxidant outlet ports and a manifold oxidant outlet port.

Further advantages are achieved and disadvantages of prior art approaches are also overcome by providing a method for using a base manifold for a modular solid oxide fuel cell assembly, comprising receiving a plurality of solid oxide fuel cell stacks relative to the base manifold; distributing fuel to the plurality of solid oxide fuel cell stacks through the manifold; distributing oxidant to the plurality of solid oxide fuel cell stacks through the manifold; collecting fuel stream flow from the plurality of solid oxide fuel cell stacks through the manifold; and collecting oxidant stream flow from the plurality of solid oxide fuel cell stacks through the manifold.

The above-described and other features and advantages will be appreciated and understood by those skilled in the pertinent art based upon the following description, drawings, and appended claims.

BRIEF DESCRIPTION OF THE DRAWINGS

Referring now to the drawings wherein like elements are numbered alike in the several figures.

DESCRIPTION EXEMPLARY EMBODIMENTS

Various types of solid oxide fuel cell ("SOFC") systems exist, including tubular or planar systems that operate with different cell configurations. Therefore, reference to a particular cell configuration, and components for use within a particular cell configuration, are intended to also represent comparable components in other cell configurations.

Generally, the system may comprise at least one SOFC assembly, one or more heat exchangers, one or more compressors, an exhaust turbine, a catalytic converter, phase change material, desulfurizer, fuel reformer, burner, preheating device, plasmatron, thermal storage system, electrical source (e.g., battery, capacitor, motor/generator, turbine, and the like, as well as combinations comprising at least one of the foregoing electrical sources), and conventional connections, wiring, control valves, and a multiplicity of electrical loads, including, but not limited to, lights, resistive heaters, blowers, air conditioning compressors, starter motors, traction motors, computer systems, radio/stereo systems, and a multiplicity of sensors and actuators, and the like, as well as combinations comprising at least one of the foregoing equipments.

Figure 1:
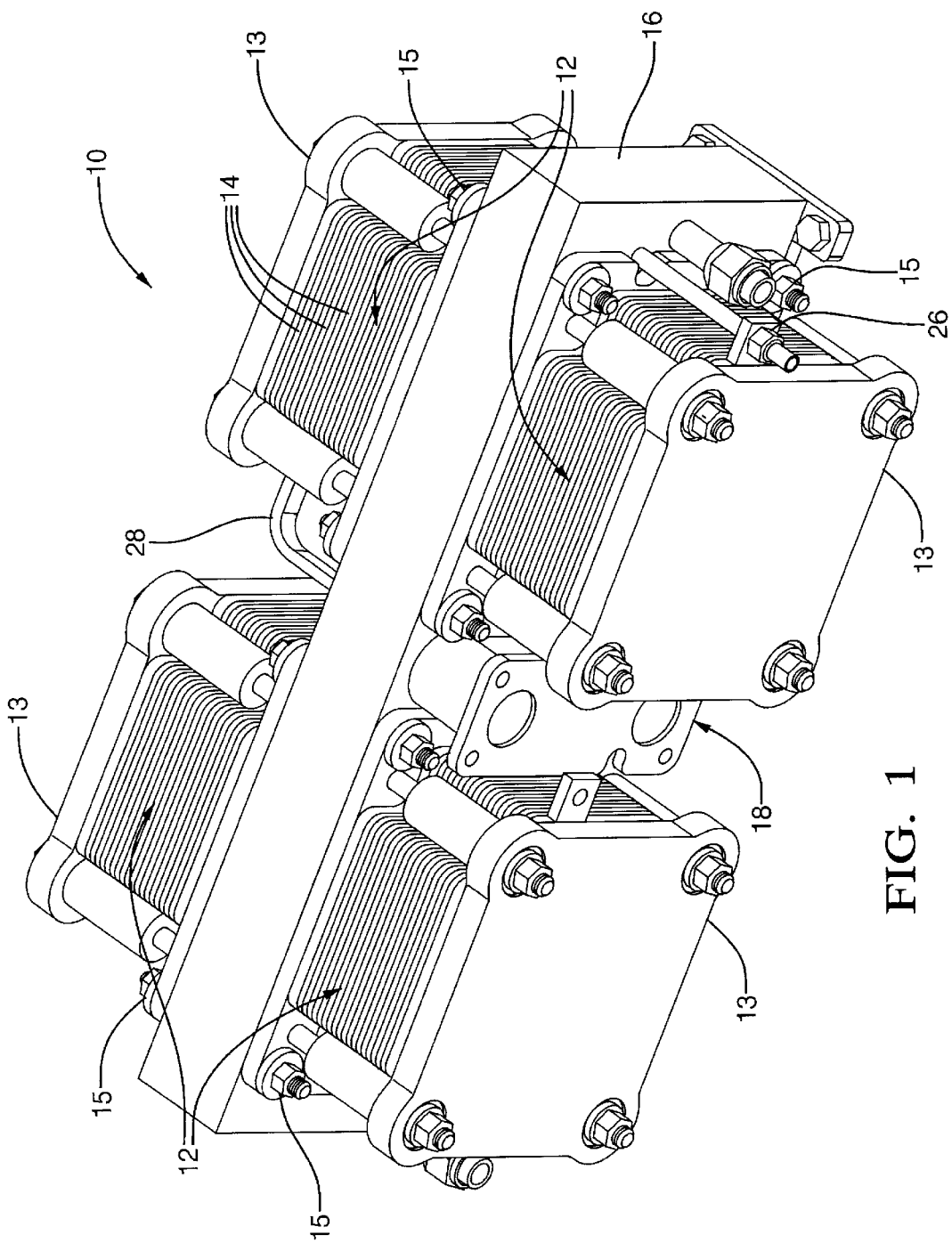
FIG. 1 is a perspective view of a modular solid oxide fuel cell ("SOFC") assembly.

In FIG. 1, an exemplary configuration of a modular SOFC assembly is indicated generally by the reference numeral 10. The assembly 10 includes four stacks 12 connected to two sides of a gas distribution manifold 16. Each stack comprises a plurality of electrochemical cells 14, such as SOFCs, sandwiched together along their planar surfaces, and located between a stack cap 13 and a stack footprint 15. Each stack footprint 15 is mechanically disposed to, but electrically insulated from the gas distribution manifold 16, for mounting the stacks 12 to the manifold 16. An alternate embodiment may have the footprints 15 electrically disposed to the manifold 16. Each stack 12 is electrically conductive, and has a top terminal 26 (only one shown) electrically connected to its cap 13, and a bottom terminal 28 (only one shown) electrically connected to its footprint 15. The assembly 10 further includes a port assembly 18 for introducing cathode air and anode fuel to the assembly 10.

The assembly 10 is modular in that each stack 12 is individually configurable to include any desired number of individual cells 14, and the exemplary manifold 16 supports up to four such stacks 12, each having any desired number of individual cells 14. Although the exemplary manifold 16 is shown to be rectilinear, it shall be understood by those of ordinary skill in the pertinent art that various other geometries may be employed, such as, for example, a non-linear manifold 16 in which the stacks 12 on one side of the manifold 16 are disposed at an angle of greater than 180 degrees to one another while the stacks on the other side of the manifold are disposed at an angle of less than 180 degrees to one another. Furthermore, the cross-sectional geometry, which is shown as rectangular, can be any geometry, including rounded, multisided, and the like, such as square, oblong, circular, hexagonal, and the like. For example, a square cross-sectional geometry manifold could be employed with one cell stack disposed each of two opposite sides of the manifold. It shall also be understood that each cell stack 12 may comprise the same or a different number of cells as any of the other cell stacks, and that further design options are enabled by varying the number of cells in the respective stacks.

Figure 2:
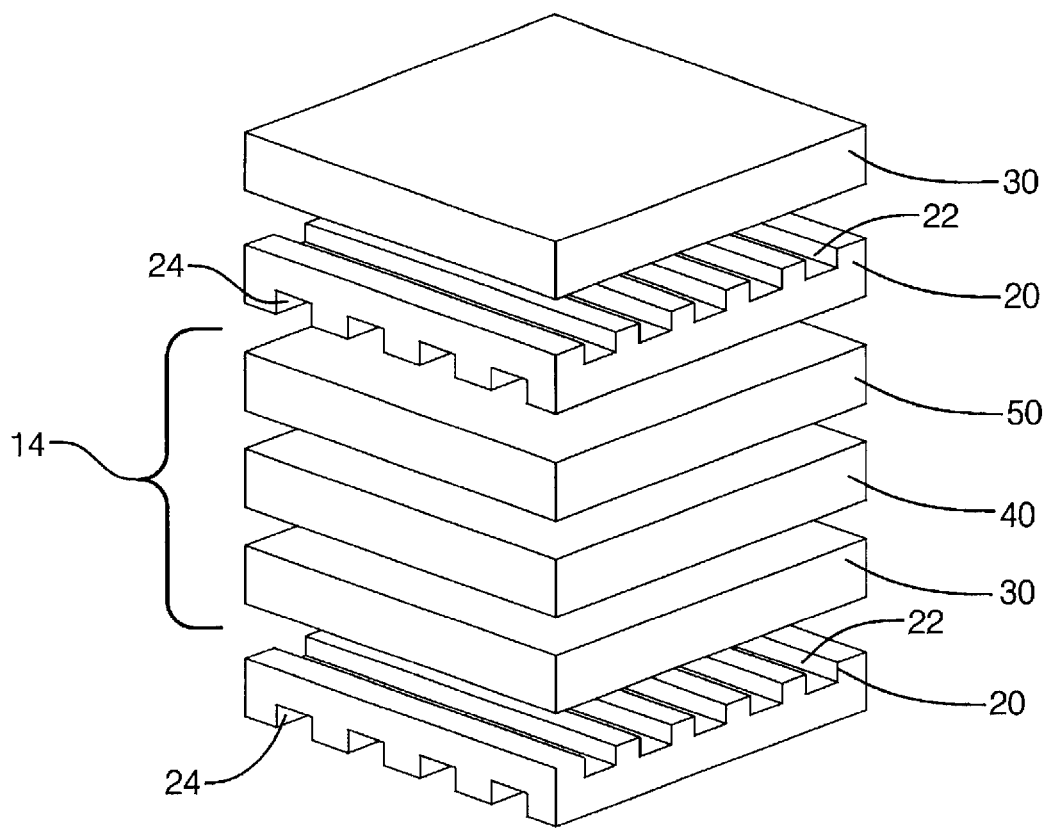
FIG. 2 is an exploded perspective view of an electrochemical cell of the SOFC assembly of FIG. 1.

Turning to FIG. 2, a single electrochemical cell 14 of a stack 12 of FIG. 1 is illustrated in greater detail. The electrochemical cell 14 comprises a fuel electrode or anode 30 and an oxygen electrode or cathode 50 disposed on opposite sides of a solid electrolyte 40. Two interconnects (or current collectors) 20 are disposed adjacent to the electrochemical cell 14. A second anode 30 is disposed adjacent to interconnect 20 to illustrate the placement of and ability to stack several electrochemical cells electrically connected to electrochemical cell 14. The passageways 22 carry fuel to the anodes 30 from a fuel inlet port at the port assembly 18 of FIG. 1. Passageway 24 carries oxygen to the cathode 50, which is thereby disposed in fluid communication to an air inlet port at the port assembly 18.

The solid electrolyte 40 of the electrochemical cell 14 can be an ion conductor that is capable of transporting oxygen ions from the cathode 50 to the anode 30, and that is compatible with the environment in which the SOFC will be utilized (e.g., temperatures of about −40° C. up to about 1,000° C.). Generally, solid electrolyte materials include conventional materials, such as ceramics or metals (e.g., alloys, oxides, gallates, and the like), including zirconium, yttrium, calcium, magnesium, aluminum, rare earths, and the like, as well as oxides, gallates, aluminates, combinations, and composites comprising at least one of the foregoing materials. Preferably the electrolyte is a rare earth oxide (such as yttria, gadolinia, neodymia, ytterbia, erbia, ceria, and the like, as well as combinations comprising at least one of the foregoing oxides) doped with aliovalent oxide(s) (such as magnesia, calcia, strontia, and the like, and other $^{+2}$ valence metal oxides).

The anode 30 and cathode 50, which form phase boundaries (gas/electrolyte/catalyst particle; commonly known as triple points) with the electrolyte 40, can be disposed adjacent to or integral with the electrolyte 40. The anode 30 and cathode 50 are generally formed of a porous material capable of functioning as an electrical conductor and capable of facilitating the appropriate reactions. The porosity of these materials should be sufficient to enable dual directional flow of gases (e.g., to admit the fuel or oxidant gases and permit exit of the byproduct gases), with a porosity of about 20% to about 40% typically preferred.

The composition of the anode 30 and cathode 50 can comprise elements such as zirconium, yttrium, nickel, manganese, strontium, lanthanum, perovskite, and the like, as well as oxides, alloys, and combinations comprising at least one of the foregoing or comparable elements. Preferably, the anode material is formed upon a ceramic skeleton, such as yttria-stabilized zirconica, for thermal compatibility. One preferred type of anode is an anode support, wherein the electrolyte is formed on the anode support.

Either or both of the anode 30 and the cathode 50 can be formed on the electrolyte 40 by a variety of techniques including sputtering, chemical vapor deposition, screen printing, spraying, dipping, painting, and stenciling, among others. The electrodes are disposed typically up to about 1,000 microns or so in thickness.

The electrochemical cell 14 can be electrically connected with other electrochemical cells by using interconnects 20.

The fuel and the oxidant flow through the electrochemical cell 14 via the passageways 22 and 24 of the interconnects 20. The interconnects 20 are generally formed of a material capable of withstanding the pressures and temperatures of the SOFC, and capable of conducting electricity. For example, suitable interconnects can be in the form of non-integral conductive wool, felt, or fibrous mat, formed metals, conductive ceramics, and the like; which are capable of withstanding automobile operating conditions (e.g., temperatures of about −40° C. to about 1,000° C.); and are electrically conductive material that is compatible with the oxidizing or reducing nature of the fuel cell environment. Some possible interconnects can comprise materials such as silver, copper, ferrous materials, strontium, lanthanum, chromium, chrome, gold, platinum, palladium, nickel, titanium, conducting ceramics (e.g., doped rare earth oxides of chromium, manganese, cobalt, nickel, and the like; doped zirconia, including, zirconia doped with titanium, copper, and the like), and the like, as well as alloys, oxides, cermets, composites, and combinations comprising at least one of the foregoing materials.

Each individual electrochemical cell 14 comprising a single anode 30, a single electrolyte 40, and a single cathode 50, generates a relatively small voltage, generally in the neighborhood of about 0.6 to about 1.1 volts. Higher voltages are attained by electrically connecting a plurality of electrochemical cells in series to form a stack. The total number of cells forming a stack can range from 2 to several hundred, depending on power requirements, space and weight restrictions, economics, and the like.

Figure 3:
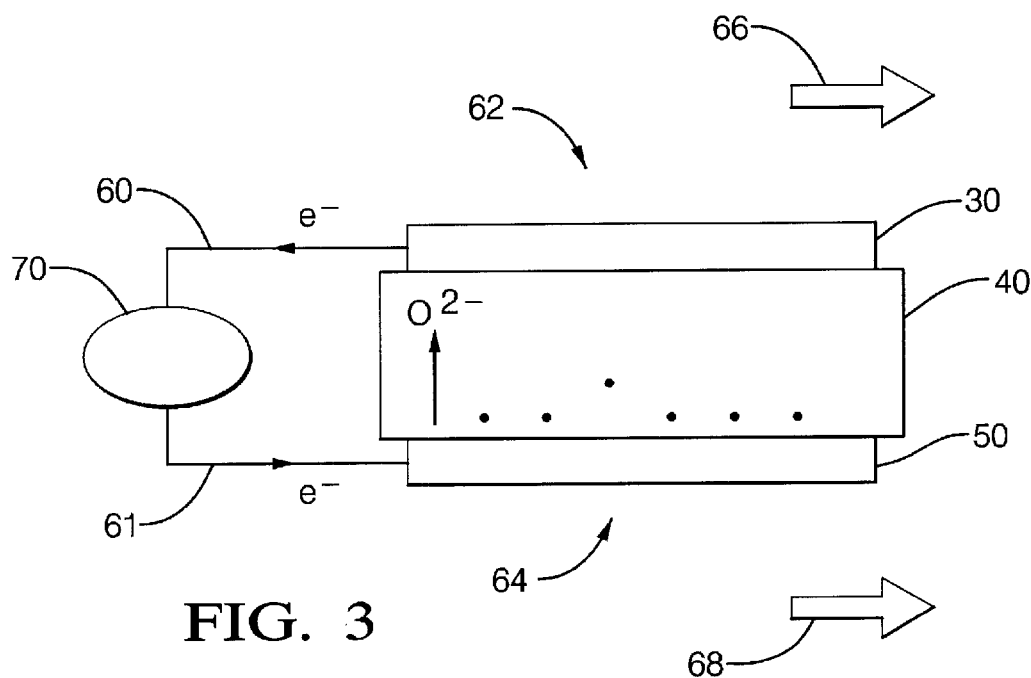
FIG. 3 is a schematic operational view of a stack of electrochemical cells of the SOFC assembly of FIG. 1.

Turning now to FIG. 3, in operation the electrochemical cell 14 produces an electron flow as illustrated by electron flow arrow 60. Note that the electrical current flow, typically measured in amperes, is opposite to the direction of negatively charged electron flow. Oxidant gases, such as oxygen or air, can be introduced to the cathode side of the cell, flowing as illustrated by the oxidant flow arrow 64. The oxidant receives the flowing electrons (e⁻) and converts them into oxygen ions (O⁻²), which diffuse through the electrolyte 40 to the anode 30, as described in the following reaction:

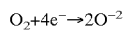

$$O_2 + 4e^- \rightarrow 2O^{-2}$$

At the anode, the oxygen ions react with a fuel, such as hydrogen, carbon monoxide, methane, reformate, or other hydrocarbon compound, which was introduced to the electrochemical cell 14 of FIG. 2 as illustrated by the fuel flow arrow 62. Reformate may comprise fuel as well as byproducts, such as, for example, $H_2$, CO, HC, $H_2O$, and $N_2$. The reaction of the fuel and oxygen ions produces electrons (e⁻), which flow outside of the electrochemical cell 14 to the external circuit 70 and back to the cathode 50. The typical fuel/oxide ion reaction is described by the following reaction formulas:

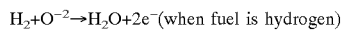
$H_2 + O^{-2} \rightarrow H_2O + 2e^-$ (when fuel is hydrogen)

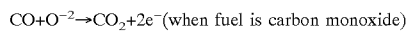
$CO + O^{-2} \rightarrow CO_2 + 2e^-$ (when fuel is carbon monoxide)

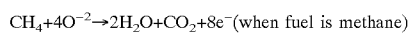
$CH_4 + 4O^{-2} \rightarrow 2H_2O + CO_2 + 8e^-$ (when fuel is methane)

Unreacted fuel and byproducts, such as water or carbon monoxide, exit the electrochemical cell 14 in the fuel stream, as illustrated by fuel stream arrow 66, while excess oxidant exits the electrochemical cell 14 in the oxidant stream, as illustrated by oxidant stream arrow 68.

Basically, the electrolyte 40 conducts these oxygen ions (O⁻²) between the anode 30 and the cathode 50, maintaining an overall electrical charge balance. The cycle of flowing electrons (e⁻) from the anode 30 through the external circuit 70 to the cathode 50 creates useable electrical energy. This electrical energy or electricity is produced by the ionization of the oxygen and can be directly utilized by the vehicle to power various electrical parts, including, but not limited to, lights, resistive heaters, blowers, air conditioning compressors, starter motors, traction motors, computer systems, radio/stereo systems, and a multiplicity of sensors and actuators, among others.

The electricity produced by the SOFC is direct current which can be matched to the normal system voltage of the vehicle, thereby reducing or avoiding the requirements for diodes, voltage converters and other inefficient devices; as well as resistive losses in the wiring and in/out of the battery generally associated with vehicle systems and hybrid electrical systems. This high efficiency electricity allows efficient electrification of the vehicle, including functions such as air conditioning and others, allowing weight savings, fuel economy, and performance advantages compared to conventional hybrid electric mechanization and conventional internal combustion engine systems. In order to meet various design criteria, each cell stack 12 may be electrically disposed in series with another, in parallel with another, in one of various series/parallel hybrid combinations with the others, or electrically undisposed from the other cell stacks 12.

Figure 4:
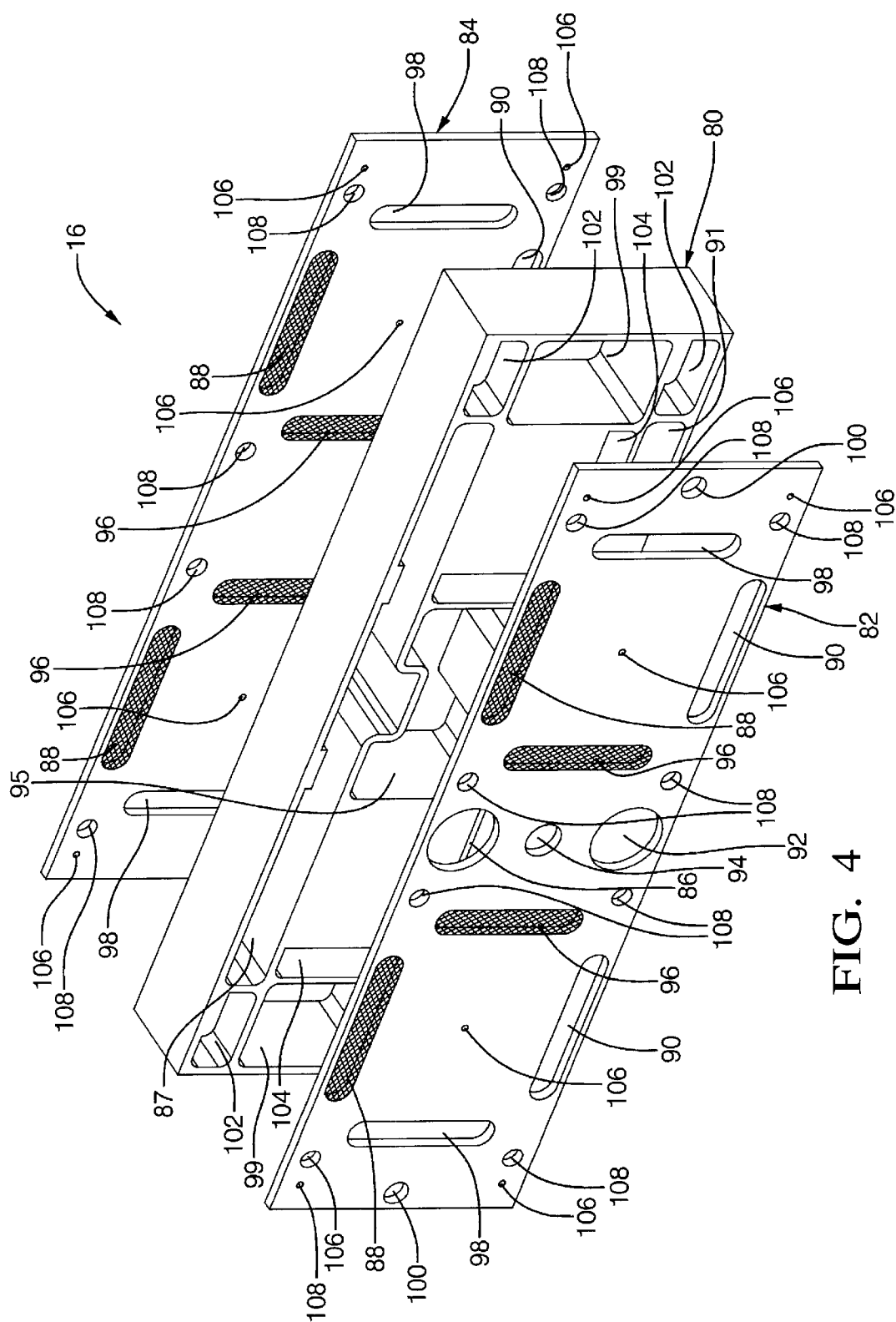
FIG. 4 is an exploded perspective view of the gas distribution manifold of the SOFC assembly of FIG. 1.

FIG. 4 illustrates the gas distribution manifold 16 of FIG. 1 in greater detail. The manifold 16 is designed to receive a plurality of cell stacks 12 of FIG. 1, physically arranged in parallel, with cells 14 of FIG. 1 of an individual stack physically arranged in series. The manifold 16 comprises first and second side plates 82, 84, respectively, with a center housing 80 disposed therebetween. The port assembly 18 of FIG. 1 mounts to the first side plate 82, and the stacks 12 of FIG. 1 mount to the outer surfaces of the first and second side plates 82 and 84. The center housing 80 has a plurality of cavities that form passageways providing fluid communication between the port assembly 18 of FIG. 1 and the stacks 12 of FIG. 1.

The first side plate 82 has an air inlet port 86 and stack air inlet ports 88 disposed in fluid communication. The center housing 80 forms a first passageway 87 to route the air from the air inlet port 86 to the stack air inlet ports 88. The stack air inlet ports 88 optionally include flow straighteners in this exemplary embodiment. An air stream flow returns from the stacks at stack air return ports 90. The center housing 80 forms a second passageway 91 to collect the air stream flow from the air return ports 90 and direct the collected air stream flow to an air outlet port 92. Thus, the stack air inlet ports 88, which optionally comprise flow straighteners, are in fluid communication with air outlet port 92 via the cell stack 12 and air return ports 90. The flow straighteners may comprise a plurality of elongated channels or like shapes to for serve the function of reducing turbulence relative to the inlet ports 88.

The first side plate 82 also has an fuel inlet port 94 and stack fuel inlet ports 96. The center housing 80 forms a third passageway 95 to route the fuel from fuel inlet port 94 to the stack fuel inlet ports 96. The stack fuel inlet ports 96 optionally include flow straighteners in this exemplary embodiment. Fuel stream flows return from the stacks at stack fuel return ports 98. The center housing 80 forms two fourth passageways 99 to collect the fuel stream flows from the fuel return ports 98 and direct the collected fuel steam flows to the fuel stream outlet ports 100. Thus, the first side plate 82 comprises a fuel inlet port 94 that is in fluid communication with cell stack inlet ports 96 via fuel passageway 95 of center housing 80; and the stack fuel inlet ports 96, which optionally comprise flow straighteners, are in fluid communication with fuel outlet ports 100 via the cell stacks 12 and the cell stack fuel return ports 98.

The second side plate 84 is similar to the first side plate 82 in that it includes stack ports 88, 90, 96, and 98 each disposed in fluid communication with the corresponding stack port of the first side plate 82 via the housing passageways 87, 91, 95, and 99, respectively. However, the second side plate 84 does not include ports 86, 92, 94, and 100 in this exemplary embodiment, although any such ports are optional in an alternate embodiment.

In addition, the side plates 82 and 84 include alignment holes 106 to facilitate an accurate alignment with the center housing 80 during assembly, and stack mounting holes 108 for receiving stack-mounting hardware. The housing 80 further includes eight chambers 102 and four chambers 104. The chambers 102 and 104 can be dead air space for helping to insulate the manifold from an outside environment. As may be recognized by one of ordinary skill in the pertinent art, at least one of the chambers 102 and 104 may optionally contain heat-conducting media in order to transfer heat from at least one surface to at least one other surface, such as, for example, from at least one of the outflow passageways 91 and 99 to at least one of the inflow passageways 87 and 95.

The manifold 16 is preferably designed to substantially simultaneously introduce fuel and air to the stacks 12 connected to the manifold 16 through passageways 95 and 87 leading to ports 96 and 88, respectively. The fuel and air is catalyzed to produce free electrons and byproducts. The energy produced by the flow of free electrons is harnessed by an external circuit, which may electrically interconnect the stacks in series to produce higher output voltages, or in parallel to produce higher output currents.

Each stack footprint 15 is configured in the same manner as each other stack footprint 15 so that the stacks 12 are interchangeable. This is possible because the stack inlet and outlet ports are defined by their connection with the air and fuel manifold ports 88, 90 and 96, 98, respectively. One or both of the direction of air flow and the direction of fuel flow through each cell stack is arbitrary.

Figure 5:
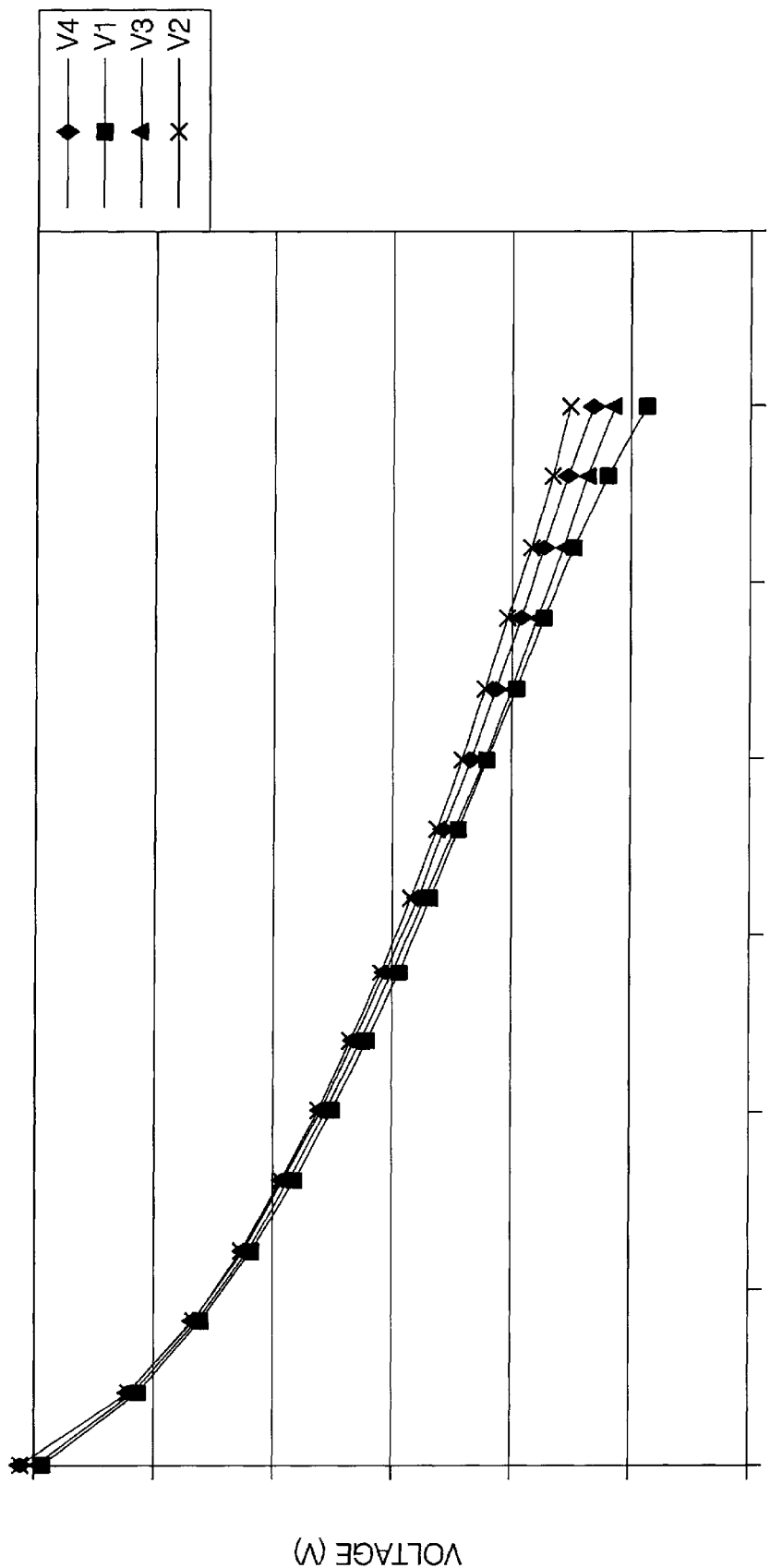
FIG. 5 is a graph of voltage output vs. current flow for the SOFC assembly of FIG. 1.

FIG. 5 illustrates experimentally obtained stack-to-stack electrical voltage distribution data indicative of the stack-to-stack voltage output for a given current flow through the SOFC assembly 10 of FIG. 1. As indicated by the data points plotted for voltages V1, V2, V3, and V4, corresponding to the voltage levels of the four stacks 12 of FIG. 1, the relative voltage output level of each stack 12 of FIG. 1 remains substantially balanced with the other stacks for elevated levels of electrical current through each stack, respectively. The substantial similarity of the voltages V1, V2, V3 and V4 indicates that the base manifold 16 provides air and fuel flow distributions from the base manifold 16 to the stacks 12 that are substantially uniform for each stack 12.

During start-up and for cabin heating, the SOFC can be operated at high adiabatic temperatures, such as up to about 1,000° C., subject to catalyst limitations. Operating temperatures of about 600° C. to about 900° C., and preferably about 650° C. to about 800° C., are typically employed. Consequently, at least one heat exchanger is preferably employed to cool the SOFC effluent and conversely heat the air prior to entering the SOFC, with conventional heat exchangers generally employed.

The fuel utilized in the system is typically chosen based upon the application, and the expense, availability, and environmental issues relating to the fuel. Possible fuels include conventional fuels such as hydrocarbon fuels, including, but not limited to, conventional liquid fuels, such as gasoline, diesel, ethanol, methanol, kerosene, and others; conventional gaseous fuels, such as natural gas, propane, butane, and others; and alternative or "new" fuels, such as hydrogen, biofuels, Fischer Tropch, dimethyl ether, and others; and synthetic fuels, such as synthetic fuels produced from methane, methanol, coal gasification or natural gas conversion to liquids, combinations comprising at least one of the foregoing methods, and the like; and combinations comprising at least one of the foregoing fuels. The preferred fuel is typically based upon the type of engine employed, with lighter fuels, i.e., those which can be more readily vaporized and/or conventional fuels which are readily available to consumers, generally preferred.

One advantage of a modular SOFC assembly as disclosed herein is that the modular configuration permits the total number of cells to be easily adjusted to meet specific electrical design criteria, such as, for example, a particular voltage or current output range. Further the stack-to-stack voltage distribution and corresponding stack-to-stack power distribution can be balanced and maintains a minimal variance for increasing current loads. In other words, a uniform flow distribution for each stack assures that one stack will not run short of air or fuel at an appreciably lower power output level than that of the other stacks.

Meanwhile, the modular configuration permits the arrangement of the cells to be easily adjusted to meet specific physical design criteria, such as, for example, a particular packaging arrangement. For example, the ability to adjust the physical design of the system simplifies placement of the SOFC assembly in a vehicle. In addition, the modules can be serviced or replaced individually, and therefore more easily than disassembling a fuller stack in a single-stack SOFC assembly.

Yet another advantage of employing the modular assembly is that the flow management is simplified by utilizing shorter flow paths allowed by shorter stacks than possible with the longer flow paths required for a single taller stack, thus reducing external plumbing and routing complexity. Meanwhile, an advantage of the SOFC manifold is that the flow straighteners contribute to uniform air and fuel flow distributions for each stack. While preferred embodiments have been shown and described, various modifications and substitutions may be made thereto without departing from the spirit and scope of this disclosure. Accordingly, it is to be understood that the present disclosure has been described by way of illustration only, and such illustrations and embodiments as have been disclosed herein are not to be construed as limiting to the claims.

What is claimed is:

1. A base manifold for a modular solid oxide fuel cell assembly, comprising:

a first side plate defining a first side of the base manifold;

a plurality of receiving areas for receiving a plurality of solid oxide fuel cell stacks;

a fuel inlet passageway disposed between a manifold fuel inlet port and a plurality of stack fuel inlet ports, the manifold fuel inlet port and the plurality of stack fuel inlet ports extending through the first side plate;

an oxidant inlet passageway disposed between a manifold oxidant inlet port and a plurality of stack oxidant inlet ports, the manifold oxidant inlet port and the plurality of stack oxidant inlet ports extending through the first side plate;

a fuel outlet passageway disposed between a plurality of stack fuel outlet ports and a manifold fuel outlet port, the plurality of stack fuel outlet ports and the manifold fuel outlet port extending through the first side plate; and an oxidant outlet passageway disposed between a plurality of stack oxidant outlet ports and a manifold oxidant outlet port, the plurality of stack oxidant outlet ports and the manifold oxidant outlet port extending through the first side plate.

2. The base manifold of claim 1, wherein the base manifold is substantially rectilinear.

3. The base manifold of claim 1, wherein the fuel inlet and fuel outlet passageways are disposed on opposite sides of a solid oxide fuel cell stack.

4. The base manifold of claim 1, wherein the oxidant inlet and oxidant outlet passageways are disposed on opposite sides of a solid oxide fuel cell stack.

5. The base manifold of claim 1, wherein the plurality of receiving areas are substantially interchangeable and configured to receive a solid oxide fuel cell stack.

6. The base manifold of claim 1, wherein at least two of the plurality of receiving areas are disposed on one side of the base manifold.

7. The base manifold of claim 1, wherein at least two of the plurality of receiving areas are disposed on opposite sides of the base manifold.

8. The base manifold of claim 1, wherein at least one of the fuel inlet passageway and the oxidant inlet passageway comprises a filter.

9. The base manifold of claim 1, further comprising at least one insulating chamber.

10. The base manifold of claim 1, further comprising at least one port assembly for admitting at least one of fuel and oxidant to the base manifold.

11. The base manifold of claim 1, further comprising:
a center housing; and
a second side plate disposed to a second side of the base manifold opposite the first side.

12. The base manifold of claim 11, wherein each of the passageways comprise a cavity in the center housing selectively aligned with at least one port in at least one of the first and second side plates.

13. The base manifold of claim 1, further comprising a second side plate defining an opposite side of the base manifold, wherein the second side plate defining the opposite side includes the plurality of stack fuel inlet and outlet ports and the plurality of the plurality of stack oxidant inlet and outlet ports as in the surface side defining the one side of the base manifold.

14. The base manifold of claim 1, wherein each of the manifold fuel and oxidant inlet ports extend from a port assembly operably coupled to the first side plate of the base manifold.

15. A modular solid oxide fuel cell comprising:
a base manifold;
a plurality of cell stacks disposed to the base manifold, each cell stack comprises at least one solid oxide fuel cell, wherein the base manifold comprises:
a first side plate defining one side of the base manifold;
a plurality of receiving areas for receiving a plurality of solid oxide fuel cell stacks;
a fuel inlet passageway disposed between a manifold fuel inlet port and a plurality of stack fuel inlet ports, the manifold fuel inlet port and the plurality of stack fuel inlet ports extending through the first side plate;
an oxidant inlet passageway disposed between a manifold oxidant inlet port and a plurality of stack oxidant inlet ports, the manifold oxidant inlet port and the plurality of stack oxidant inlet ports extending through the first side plate;
a fuel outlet passageway disposed between a plurality of stack fuel outlet ports and a manifold fuel outlet port, the plurality of stack fuel outlet parts and the manifold fuel outlet port extending through the first side plate; and
an oxidant outlet passageway disposed between a plurality of stack oxidant outlet ports and a manifold oxidant outlet port, the plurality of stack oxidant outlet ports and the manifold oxidant outlet port extending through the first side plate.

16. The solid oxide fuel cell assembly of claim 15, wherein each cell stack comprises the same number of cells as each other cell stack.

17. The solid oxide fuel cell assembly of claim 15, wherein the cell stacks are disposed electrically in series.

18. The solid oxide fuel cell assembly of claim 15, wherein the cell stacks are disposed electrically in parallel.

19. The solid oxide fuel cell assembly of claim 15, wherein the cell stacks are disposed electrically in a series/parallel hybrid combination.

20. A method for using a base manifold for a modular solid oxide fuel cell assembly, comprising:
distributing fuel to a plurality of solid oxide fuel cell stacks through a first side plate defining a first side of the base manifold;
distributing oxidant to the plurality of solid oxide fuel cell stacks through the first side plate of the base manifold;
collecting fuel stream flow from the plurality of solid oxide fuel cell stacks through the first side plate of the base manifold; and
collecting oxidant stream flow from the plurality of solid oxide fuel cell stacks through the first side plate of the base manifold.

21. The method as defined in claim 20, further comprising:
flowing substantially uniform rates of fuel to each of the solid oxide fuel cell stacks; and
flowing substantially uniform rates of oxidant to each of the solid oxide fuel cell stacks.

22. The method as defined in claim 21, further comprising:
filtering the distributed fuel for at least one of the solid oxide fuel cell stacks; and
filtering the distributed oxidant for at least one of the solid oxide fuel cell stacks.

23. The method as defined in claim 20, further comprising:
distributing fuel to a portion of the plurality of solid oxide fuel cell stacks through a second side plate defining an opposite side of the first side of the base manifold; and
distributing oxidant to the portion of the plurality of solid oxide fuel cell stacks through the second side plate of the base manifold.

* * * * *